US012427490B2

(12) United States Patent
Empl et al.

(10) Patent No.: US 12,427,490 B2
(45) Date of Patent: Sep. 30, 2025

(54) RECEIVING DEVICE FOR RECEIVING A BOTTLE ON A CARBONATION MACHINE; CARBONATION MACHINE, AND METHOD FOR USING A CARBONATION MACHINE

(71) Applicant: SODAPOP GmbH, Bergisch Gladbach (DE)

(72) Inventors: Günter Empl, Bergisch Gladbach (DE); Stefan Stalder, Zollikofen (CH)

(73) Assignee: SODAPOP GmbH, Bergisch Gladbach (DE)

( * ) Notice: Subject to any disclaimer, the term of this patent is extended or adjusted under 35 U.S.C. 154(b) by 0 days.

(21) Appl. No.: 18/692,119

(22) PCT Filed: Sep. 28, 2022

(86) PCT No.: PCT/EP2022/077032
§ 371 (c)(1),
(2) Date: Mar. 14, 2024

(87) PCT Pub. No.: WO2023/052460
PCT Pub. Date: Apr. 6, 2023

(65) Prior Publication Data
US 2024/0316514 A1 Sep. 26, 2024

(30) Foreign Application Priority Data
Oct. 1, 2021 (DE) ........................ 102021 211 109.2

(51) Int. Cl.
*B01F 35/42* (2022.01)
*B01F 23/2361* (2022.01)
*B01F 23/237* (2022.01)

(52) U.S. Cl.
CPC ........ *B01F 35/422* (2022.01); *B01F 23/2361* (2022.01); *B01F 23/237621* (2022.01)

(58) Field of Classification Search
CPC ............ B65D 41/0478; B65D 41/0407; B01F 35/422; B01F 23/2361
(Continued)

(56) References Cited

U.S. PATENT DOCUMENTS 7,000,650 B2 * 2/2006 Desjardins ................ B65B 3/12 141/85
7,523,768 B2 * 4/2009 Chassaing ............. B65B 31/003 141/369
(Continued)

FOREIGN PATENT DOCUMENTS

DE 19709353 C1 6/1998
EP 3040114 B1 3/2019
(Continued)

OTHER PUBLICATIONS

International Search Report and Written Opinion dated Feb. 6, 2023, for International Application PCT/EP2022/077032.
(Continued)

*Primary Examiner* — Timothy L Maust
(74) *Attorney, Agent, or Firm* — The Dobrusin Law Firm, P.C.

(57) ABSTRACT

A carbonation machine that includes a receiving device for receiving a bottle, the receiving device has a fastening device which has an iris device, which has an opening configured to have a variable size, the receiving device is transferable from a bottle-receiving state, which is configured for receiving the bottle, into an attachment state, in which the bottle is attached to the receiving device, and as the receiving device is transferred from the bottle-receiving state into the attachment state, a size of the opening of the iris device decreases, and in the bottle-receiving state, the bottle is arranged in a non-vertical receiving position on the receiving device; and in the attachment state, the bottle is arranged in a preparation position, and as the receiving
(Continued)

device is transferred from the bottle-receiving state into the attachment state, the bottle is tilted from the non-vertical receiving position into the preparation position.

23 Claims, 11 Drawing Sheets

(58) Field of Classification Search
USPC .......................................................... 220/200
See application file for complete search history.

(56) References Cited

U.S. PATENT DOCUMENTS

| | | | | |
|---|---|---|---|---|
| 8,920,860 | B2 * | 12/2014 | Ring | B01F 23/2361 426/477 |
| 9,810,375 | B2 | 11/2017 | Rider et al. | |
| 2013/0153084 | A1 * | 6/2013 | Camilotti | B65B 31/025 141/83 |
| 2017/0297758 | A1 * | 10/2017 | Stenner | B65C 3/26 |

FOREIGN PATENT DOCUMENTS

| | | | |
|---|---|---|---|
| WO | 0007706 | A1 | 2/2000 |
| WO | 2021/150643 | A1 | 7/2021 |
| WO | 2021/174314 | A1 | 9/2021 |

OTHER PUBLICATIONS

International Preliminary Report on Patentability dated Sep. 12, 2023, for International Application PCT/EP2022/077032.

* cited by examiner

RECEIVING DEVICE FOR RECEIVING A BOTTLE ON A CARBONATION MACHINE; CARBONATION MACHINE, AND METHOD FOR USING A CARBONATION MACHINE

CROSS-REFERENCE TO RELATED APPLICATIONS

This application is a US National Stage of PCT/EP2022/077032 filed on Sep. 28, 2022, which claims priority to DE 10 2021 211 109.2 filed on Oct. 1, 2021, all of which are hereby incorporated by reference herein in their entirety for all purposes.

FIELD

The present invention relates to a receiving device for receiving a bottle on a carbonation machine.

BACKGROUND

Such receiving devices are generally known as part of carbonation machines that are provided for carbonating a liquid, such as water. Such carbonation machines are in particular also referred to as drinking water carbonators and are used as household appliances by end consumers. Carbonation machines may be used in principle for carbonating different liquids and for preparing various beverages. For the carbonating operation, the machines typically have an exchangeable $CO_2$ cartridge that provides the gas that is added to the liquid. The liquid that is to be carbonated is typically poured into a bottle. The bottle with the liquid is then attached to the carbonation machine in order for the carbonating operation to be performed.

EP 3 040 114 B1 has disclosed a carbonation machine for household use, comprising a carbonation assembly for carbonating liquid in a bottle using pressurized gas from a filling vessel, and comprising a pronged clamp for fastening the bottle to the carbonation machine.

An important aspect is that the bottle must be fastened securely and stably to the machine, because an elevated pressure prevails during the carbonating operation. In order to reliably withstand this pressure and in order that the bottle does not become undesirably detached from the machine, a correspondingly reliable and stable connection must be established between the bottle and the machine. At the same time, the connection must be releasable in a user-friendly and convenient manner after the liquid has been carbonated, and must preferably be designed for a high number of carbonating operations over its service life.

SUMMARY

It is an object of the present invention to provide a receiving device for receiving a bottle on a carbonation machine, which receiving device allows the bottle to be fastened in a user-friendly manner, and at the same time securely and stably, to the carbonation machine.

Said object is achieved by means of a receiving device according to the present disclosure. The receiving device according to the invention for receiving a bottle on a carbonation machine has the advantage over the prior art that, by means of the iris device, it can be achieved that the bottle is advantageously attached in the receiving device and is secured against sliding out of the receiving device. In particular, the iris device serves for fastening the bottle the receiving device such that the bottle can no longer escape downwardly from the receiving device. It is in particular conceivable that, in the attachment state, the bottle is fastened to the receiving device with a clearance, but so as to no longer be removable and so as to be secured against undesired downward detachment from the receiving device, by means of the fastening device and in particular with the aid of the iris device.

Typically, for the intended carbonation of the liquid in the bottle, it is necessary for the bottle to be fixed in a way that can reliably withstand even a high pressure that prevails during the carbonating operation, without the bottle becoming detached from the carbonation machine in the process. According to the invention, by means of the iris device, the bottle can be attached to the receiving device in a way that reliably withstands even the high pressure during the carbonating operation. At the same time, the receiving device according to the invention is advantageously easy to operate and provides a high level of user convenience, for example because it eliminates the need for the bottle to be laboriously screwed in manually by a user.

According to the invention, it is preferably conceivable for the receiving device to be provided for receiving a bottle for a carbonation machine for household use.

By means of the receiving device according to the invention for receiving a bottle on a carbonation machine, the bottle is in particular reversibly connectable to the carbonation machine. The bottle can thus preferably be released from the carbonation machine after the end of the carbonating operation.

The bottle is preferably manufactured entirely or partially from glass. It is alternatively or additionally conceivable for the bottle to comprise plastics material and/or metal.

The bottle is preferably designed to withstand an internal pressure that is elevated in relation to normal ambient pressure (of approximately 1 bar). For example, it is conceivable for the bottle to be designed to withstand an internal pressure of up to 11 bar, preferably up to 15 bar, particularly preferably up to 18 bar, without rupturing (at a temperature of 20° C. and an ambient pressure of 1 bar).

The carbonation machine can preferably be fitted with an exchangeable gas cartridge, in particular a $CO_2$ cartridge, which provides the gas for carbonating the liquid. The liquid that is to be carbonated is preferably poured into the bottle, and is particularly preferably present in the bottle when the bottle is received in the receiving device.

The liquid that is to be carbonated may for example be water or a flavored beverage.

Advantageous developments and refinements of the invention can be found in the disclosure herein and in the description that refers to the drawings.

In one preferred embodiment of the present invention, the iris device has an, in particular central, opening, wherein the opening of the iris device preferably has a variable size, in particular a variable opening diameter. The opening of the iris device is provided for receiving a bottle neck of the bottle. In one refinement of the invention, the iris device may thus also be understood as an iris aperture device. A variation of the size of the opening of the iris device enables the bottle to firstly be introduced into the opening of the iris device and subsequently fastened by means of the iris device to the receiving device.

In a preferred embodiment of the present invention, the receiving device is transferable from a bottle-receiving state, which is provided for receiving the bottle, into an attachment state, in which the bottle is attached to the receiving device, wherein the receiving device is configured such that, as the receiving device is transferred from the bottle-receiving state into the attachment state, the size of the opening of the iris device decreases. A particularly high level of user convenience can thus be achieved, because the bottle can be fastened automatically as the receiving device is transferred from the bottle-receiving state into the attachment state, in particular without the need for a separate mechanism or triggering means (for example a pushbutton) to be actuated for this purpose. Furthermore, no motor system or the like is required for fixing and securely fastening the bottle, whereby fault susceptibility and costs can be reduced.

In one preferred embodiment of the present invention, the iris device has an iris element, wherein the iris element is pivotable, wherein the iris element is arranged in a radially outer position in the bottle-receiving state, wherein, as the receiving device is transferred from the bottle-receiving state into the attachment state, the iris element is pivoted from its radially outer position into a radially inner position about a pivot axis, wherein the radially inner position is preferably provided for fastening the bottle. The size of the opening of the iris device is thus variable by means of the iris element. In particular, as the receiving device is transferred from the bottle-receiving state into the attachment state, the movement of the iris element causes the opening of the iris device to automatically become smaller, such that the bottle is fastened to the receiving device and can no longer slide out downward.

In one preferred embodiment of the present invention, the iris element has a guide means, wherein the fastening device has an intermediate element, wherein the intermediate element has a counterpart guide means which in particular complements the guide means of the iris element, wherein, as the receiving device is transferred from the bottle-receiving state into the attachment state, the iris element is guided from its radially outer position into its radially inner position by the guide means and the counterpart guide means. The guide means of the iris element advantageously makes it possible that, as the receiving device is transferred from the bottle-receiving state into the attachment state, the iris element is automatically positively guided radially inward toward the bottle, such that the bottle is fastened in such a way that it can no longer escape downwardly from the receiving device.

In one preferred embodiment of the present invention, the intermediate element has a further guide means, wherein the receiving device has a further counterpart guide means which in particular complements the further guide means of the intermediate element, wherein the receiving device is configured such that—as the receiving device is transferred from the bottle-receiving state into the attachment state—the intermediate element is guided by the further guide means and the further counterpart guide means such that the intermediate element performs a rotational movement, in particular in a circumferential direction of the intermediate element.

In one preferred embodiment of the present invention, the receiving device is configured such that—as the receiving device is transferred from the bottle-receiving state into the attachment state—the iris element is guided from its radially outer position into its radially inner position by the rotational movement of the intermediate element and by the guide means and the counterpart guide means. There are thus advantageously two elements to the positive guidance of the iris element as the receiving device is transferred from the bottle-receiving state into the attachment state. Owing to the tilting movement of the fastening device—as the receiving device is transferred from the bottle-receiving state into the attachment state—the intermediate element is forced to perform a rotational movement by its further guide means, which interacts with the further counterpart guide means. This rotational movement of the intermediate element causes the counterpart guide means of the intermediate element to be moved relative to the guide means of the iris element, which interacts with the counterpart guide means, whereby the iris element is pivoted and, in the process, is guided from its radially outer position into its radially inner position. The size of the opening of the iris device is thus reduced, such that the bottle is advantageously fastened.

In one preferred embodiment of the present invention, the iris device has a plurality of iris elements, wherein the iris elements are each pivotable, wherein the iris elements are each arranged in a radially outer position in the bottle-receiving state, wherein, as the receiving device is transferred from the bottle-receiving state into the attachment state, the iris elements are each pivoted from their radially outer positions into radially inner positions about their pivot axes, wherein the radially inner positions are preferably provided for fastening the bottle. The iris elements are preferably each guided from their radially outer positions into their radially inner positions by means of the intermediate element as the receiving device is transferred from the bottle-receiving state into the attachment state. The pivot axes of the plurality of iris elements are preferably arranged parallel to one another. In particular, it is conceivable that the pivot axes of the iris elements are parallel to the central axis of the bottle both when the receiving device is in the bottle-receiving state (when the bottle has already been placed into the receiving device) and when the receiving device is in the preparation state. In particular, it is conceivable that, during the tilting movement of the bottle (as the receiving device is transferred from the bottle-receiving state into the attachment state), the pivot axes of the iris elements are tilted concomitantly so as to remain parallel to the central axis of the bottle. It is preferable if the iris elements of the plurality of iris elements all pivot in a right-handed movement, that is to say in particular clockwise, or all pivot in a left-handed movement, that is to say in particular counterclockwise, during their movements from their radially outer positions into their radially inner positions.

In one preferred embodiment of the present invention, the plurality of iris elements together form the iris device. The iris elements are arranged in a circumferential direction so as to have a central opening. It is conceivable for the iris elements to directly adjoin one another in the circumferential direction, or for a gap to be present between adjacent iris elements in the circumferential direction. In a refinement of the present invention in which all adjacent iris elements directly adjoin one another, the opening formed by the iris elements is completely enclosed in the circumferential direction by the iris elements. By contrast, in an alternative refinement of the present invention in which some or all iris elements have gaps in the circumferential direction to the adjacent iris elements, the opening of the iris device is not completely enclosed in the circumferential direction, but rather has gaps.

In one preferred embodiment of the present invention, the plurality of iris elements comprise five iris elements. It is alternatively conceivable for the plurality of iris elements to comprise three, four, six or more than six iris elements.

In one preferred embodiment of the present invention, the pivoting of the plurality of iris elements from their radially outer positions into their radially inner positions causes the size of the opening of the iris device to decrease. The iris elements are preferably each pivotable, such that the size of the opening of the iris device varies as a result of a pivoting movement of the plurality of iris elements. The iris device is thus in the form of an iris aperture. In one preferred embodiment of the present invention, the fastening and/or securing of the bottle to the receiving device takes place as the receiving device is transferred from the bottle-receiving state into the attachment state, that is to say in particular only after the bottle has been received in the receiving device in the bottle-receiving state. It is preferably possible for such fastening and/or securing of the bottle to be performed by means of the iris device. As the bottle is received on the carbonation machine in the bottle-receiving state, the iris device is preferably in an opened state, in which the bottle is not yet fastened to the receiving device by the iris device. In this opened state, the opening of the iris device is of such a size that the bottle neck, preferably including any projections on the bottle neck, can be moved into the opening of the iris device. As the receiving device is transferred from the bottle-receiving state into the attachment state, the size of the opening of the iris device automatically decreases, in particular owing to the positive guidance of the plurality of iris elements by means of the intermediate element, such that the iris device is transferred into a state in which the bottle is fastened in the receiving device, in particular with a clearance, and/or such that removal and detachment of the bottle from the receiving device are prevented.

In one preferred embodiment of the present invention, when the receiving device is in the bottle-receiving state, the bottle can be arranged in an, in particular non-vertical, receiving position on the receiving device, wherein, in the attachment state, the bottle is arranged in an, in particular vertical, preparation position. The, in particular non-vertical or oblique, receiving position or receiving orientation, and the, in particular vertical, preparation position or preparation orientation, of the bottle relate for example to an orientation of the central axis of the bottle relative to an underlying surface on which the carbonation machine is arranged. Thus, in a vertical preparation position, the bottle is for example arranged perpendicularly with respect to an underlying surface, and in a non-vertical receiving position, the bottle is tilted in relation to the vertical preparation position.

In one preferred embodiment of the present invention, as the receiving device is transferred from the bottle-receiving state into the attachment state, the bottle performs a tilting movement from the, in particular non-vertical, receiving position into the, in particular vertical, preparation position. During the transfer from the bottle-receiving state into the attachment state, the fastening device for the bottle is preferably, at least in part, pivoted or tilted concomitantly with the bottle such that the bottle is transferred from a non-vertical receiving position into a vertical preparation position. It is however preferable here for not all elements of the receiving device to be tilted or concomitantly moved. For example, it is conceivable that the further counterpart guide means of the receiving device is not concomitantly moved and tilted, but remains immovable in its position on the carbonation machine. The further counterpart guide means thus allows guidance of the intermediate element such that, during the tilting movement of the bottle, the intermediate element is forced by the further counterpart guide means and the further guide means to perform a rotational movement, whereby the size of the opening of the iris device changes.

It is alternatively conceivable that, in the attachment state, the bottle is arranged in a non-vertical preparation position, such that its central axis is for example arranged at an angle with respect to the normal to a surface on which the carbonation machine is arranged. In this case, it is conceivable for the carbonation to be performed with the bottle in a non-vertical preparation position. In this case, too, it is conceivable that, during the transfer from the bottle-receiving state into the attachment state, the bottle attached to the receiving device is preferably tilted or changes its angle with respect to the underlying surface. The bottle and the receiving device provided for receiving the bottle thus at least partially perform a tilting or rotational movement during the transfer from the bottle-receiving state into the attachment state.

In one preferred embodiment of the present invention, the guide means of the iris element has a projection, pin and/or bolt, wherein the counterpart guide means of the intermediate element preferably has a rail configured for guiding the guide means, in particular has a recess and/or depression. Particularly advantageous automatic fixing of the bottle is thus possible.

It is alternatively conceivable that the guide means has a rail, in particular a recess and/or depression, wherein the counterpart guide means of the intermediate element preferably has a projection, pin and/or bolt for the purposes of guiding the guide means. In this case, the counterpart guide means preferably has a projection, pin and/or bolt which engages into the rail of the guide means. The guide means and counterpart guide means for the further iris elements of the plurality of iris elements may for example be designed correspondingly to the guide means and counterpart guide means for guiding the iris element.

In one preferred embodiment of the present invention, it is conceivable for the bottle to have, in a circumferential direction, a projection and/or bead which, in the attachment state, is arranged above the iris device, in particular above the iris elements of the iris device. By means of the projection and/or bead, it is particularly advantageously possible to prevent the bottle from being able to be pushed downwardly out of the fastening device by the pressure that prevails during the carbonating operation. It is conceivable for the projection and/or bead to be formed in a circumferential direction on the bottle neck of the bottle over the entire circumference, or alternatively only over a sub-region and/or in certain portions, that is to say with one or more gaps. In the attachment state, the iris device encompasses the bottle neck, in particular below the projection and/or bead of the bottle neck. Thus, in the attachment state, the projection and/or bead of the bottle neck can rest on the iris device. This particularly advantageously prevents the bottle from being able to escape downwardly from the receiving device.

In one embodiment of the present invention, it is additionally or alternatively conceivable for the bottle to have, in a circumferential direction, a corrugation into which the iris device can engage. The corrugation of the bottle is preferably a corrugation that completely encircles the bottle neck of the bottle, such that the bottle does not need to be inserted in a specified rotational angle into the carbonation machine. In one embodiment of the present invention, it is conceivable for the corrugation to be arranged below the projection and/or bead of the bottle neck, particularly preferably so as to directly adjoin the projection and/or bead. It is alternatively conceivable for the bottle neck to have only either a corrugation of said type or a projection and/or bead.

In one preferred embodiment of the present invention, the iris element and its guide means are formed as a single piece.

This is correspondingly conceivable for each of the further iris elements of the plurality of iris elements of the iris device. The individual iris elements of the plurality of iris elements are preferably mutually separate parts.

In one preferred embodiment of the present invention, the iris element has a plastics material, wherein the plurality of iris elements preferably each have a plastics material. It is thus possible for the iris elements to each be plastics parts. It is conceivable for the iris element or the plurality of iris elements to additionally or alternatively have further materials, for example one or more metals.

In one preferred embodiment of the present invention, the further guide means of the intermediate element has a projection, pin and/or bolt, wherein the further counterpart guide means of the receiving device preferably has a rail configured for guiding the further guide means, in particular has a recess and/or depression. The rail preferably has a curving region and/or a region that is inclined relative to a vertical direction of the carbonation machine, such that the further guide means is forced to perform a horizontal movement as it moves vertically in the rail of the further counterpart guide means. The intermediate element thus performs a rotational movement as the receiving device is transferred from the bottle-receiving state into the attachment state, in particular during the tilting movement of the bottle. Via the counterpart guide means and guide means, this rotational movement of the intermediate element causes the iris element to be moved in the direction of the bottle neck as the receiving device is transferred from the bottle-receiving state into the attachment state.

It is alternatively conceivable that the further guide means of the intermediate element has a rail, in particular a recess and/or depression, wherein the further counterpart guide means of the receiving device preferably has a projection, pin and/or bolt for the purposes of guiding the further guide means. In this case, the further counterpart guide means preferably has a projection, pin and/or bolt which engages into the rail of the further guide means.

In one preferred embodiment of the present invention, the intermediate element comprises a disk-shaped main body, preferably having a central opening.

In one embodiment of the present invention, it is conceivable for the counterpart guide means of the intermediate element for guiding the plurality of iris elements to be formed in particular as rails in the main body of the intermediate element, in which rails the guide means of the plurality of iris elements are each guided. The further guide means of the intermediate element is in particular a projection, pin and/or bolt that protrudes outwardly from the main body of the intermediate element. During the tilting movement of the fastening device from the bottle-receiving state into the attachment state, the further guide means, that is to say in particular the projection, pin and/or bolt, moves in a vertical direction in the further counterpart guide means, designed as a rail, of the receiving device. Here, the further counterpart guide means does not concomitantly perform the tilting movement of the bottle and fastening device, but preferably remains static relative to the surface underlying the carbonation machine. The further guide means is in this case (that is to say during its vertical movement in the counterpart guide means) forced to perform a sideward movement owing to the geometrical design of the further counterpart guide means. This sideward movement of the further guide means causes the rotational movement of the intermediate element in the circumferential direction. The rotational movement of the intermediate element in the circumferential direction causes the counterpart guide means of the intermediate element, that is to say the rails and/or cutouts of the intermediate element, to also move in the circumferential direction, such that the counterpart guide means of the intermediate element are moved relative to the guide means of the iris elements. The geometrical design of the counterpart guide means is in particular such that, in this case (that is to say during the rotational movement of the intermediate element), the guide means are guided in a radial direction by the counterpart guide means, which leads to a pivoting movement of the plurality of iris elements in the direction of the bottle neck. This causes the size of the opening of the iris device to be reduced and the iris device to be guided into a locking position in which it prevents the bottle from being able to escape downwardly from the receiving device.

The present invention furthermore relates to a carbonation machine comprising a receiving device for receiving a bottle according to an embodiment of the present invention.

In one preferred embodiment of the present invention, in particular of the carbonation machine, it is conceivable that, as the receiving device is transferred from the bottle-receiving state into the attachment state, the bottle performs a tilting movement, as a result of which the bottle is transferred from an, in particular oblique, receiving position (in the bottle-receiving state) into an, in particular vertical, preparation position (in the attachment state). It is preferably possible for the fastening of the bottle by means of the fastening device to take place during the tilting movement of the bottle from its, in particular oblique, receiving position (in the bottle-receiving state) into its, in particular vertical, preparation position. In the preparation position, the bottle preferably still has a clearance within the receiving device. However, in the preparation position, the fastening device prevents the bottle from being able to exit the receiving device. It is preferably possible for the transfer of the receiving device from the bottle-receiving state into the attachment state to take place by way of the tilting movement of the bottle. The tilting movement of the bottle may for example be performed by a user, who moves the bottle from the receiving position into the preparation position. It is alternatively or additionally possible that the bottle performs the tilting movement from the receiving position into the preparation position (in particular after the bottle has been received in the carbonation machine by means of the receiving device) automatically under gravitational force, in particular without additional force being applied by the user. It is alternatively or additionally conceivable that the carbonation machine, in particular the receiving device for receiving the bottle, is acted on by a spring force, wherein the spring force causes and/or assists the tilting movement of the bottle (in particular after the bottle has been inserted into the carbonation machine in the bottle-receiving state). In one embodiment of the present invention, fastening of the bottle to the carbonation machine or to the receiving device for receiving the bottle does not yet take place in the bottle-receiving state, in particular as the bottle is received or inserted. It is thus particularly advantageously possible that the bottle does not need to be separately fastened as the bottle is received in the bottle-receiving state. The need for the bottle to be screwed into the carbonation machine, for example, can thus be eliminated. The fastening/fixing of the bottle advantageously takes place for the first time as the receiving device is transferred from the bottle-receiving state into the attachment state, and in particular in automated fashion, thus increasing user convenience and ease of operation.

In one preferred embodiment of the present invention, in particular of the carbonation machine, the carbonation machine comprises a safety element, in particular a safety door and/or safety window, wherein, in the attachment state, the safety element can be arranged in front of the bottle such that, by means of the safety element, the bottle is arranged, in particular entirely, within the carbonation machine. The safety element thus protects the surroundings of the carbonation machine, and in particular a user, in the event of accidents. For example, it is conceivable that the bottle has damage that is not perceived by or perceptible to the user. In this case, the bottle could rupture or shatter as a result of the high pressure during the carbonating operation. However, since the safety element is arranged in front of the bottle during the carbonating operation, the safety element protects the surroundings and the user. The safety element may for example comprise safety glass and/or some other material, for example a metal and/or a plastics material, which withstands a shattering/exploding bottle or offers protection against the fragments of the bottle. It is conceivable that the safety element is automatically arranged in front of the bottle, for example pushed in front of the bottle, as the receiving device is transferred from the bottle-receiving state into the attachment state, or that a user arranges the safety element in front of the bottle. Closure of the safety element using an actuation element, such as a pushbutton, is also conceivable. For example, the safety element may be a sliding door which automatically closes as a result of the tilting movement of the bottle as the receiving device is transferred from the bottle-receiving state into the attachment state.

The carbonation machine preferably comprises an actuation element for the initiation of a carbonating operation by a user, said actuation element being coupled to the safety element, in particular the safety door and/or safety window, such that a carbonating operation can be started only when the safety element has been arranged in front of the bottle such that, by means of the safety element, the bottle is arranged, in particular entirely, within the carbonation machine.

In one preferred embodiment of the present invention, in particular of the carbonation machine, the carbonation machine comprises a seal means for sealing off the bottle with respect to surroundings during a carbonating operation, wherein the seal means seals off the bottle with respect to the surroundings, in particular by means of a pressure provided by a gas cartridge, during the carbonating operation. Pneumatic compensation is thus achieved. Here, the gas cartridge is in particular the gas cartridge that provides the gas for carbonating the liquid. It is thus advantageously possible for the sealing of the bottle with respect to the surroundings to take place as a result of the actuation of an actuation means for initiating the carbonating operation, for example as a result of the actuation of a pushbutton or touchpad. The gas pressure that is provided by the gas cartridge (during the carbonating operation) is thus particularly advantageously also used for sealing off the bottle, which has the liquid that is to be carbonated, to the outside during the carbonating operation.

In one embodiment of the present invention, in the attachment state and in particular during the carbonating operation, a gas feed means projects into the bottle. The gas cartridge is attached to the gas feed means such that, during the carbonating operation, the gas from the gas cartridge is introduced via the gas feed means into the bottle for the purposes of carbonating the liquid. The gas feed means is in particular led through a passage opening in the seal means, and thus projects into the bottle. The gas pressure that is provided by the gas cartridge (during the carbonating operation) is preferably also used for pushing the seal means against the bottle and thus sealing off the bottle to the outside during the carbonating operation. The liquid in the bottle can thus be carbonated in an advantageous manner via the gas feed means that projects into the bottle.

In one embodiment of the present invention, it is conceivable that the seal means protrudes in a radial direction beyond the bottle neck or beyond the mouth region of the bottle, such that, when said seal means is pushed against the mouth region of the bottle by the pressure provided by the gas cartridge, said seal means reliably seals off the bottle to the outside. It is alternatively conceivable that the seal means does not protrude in a radial direction beyond the mouth region of the bottle. The seal means preferably has an, in particular central, passage opening for the leadthrough of the gas feed means, such that the gas feed means projects through the seal means into the interior of the bottle. It is conceivable for the seal means to be at least partially elastic in order to achieve an advantageous seal when the seal means is pressed against the bottle or the mouth region of the bottle. In particular, with an elastic or partially elastic seal means, it is also possible for tolerances of the bottle, in particular unevennesses on the bottle neck, to be advantageously compensated, thus enabling particularly advantageous sealing of the bottle. The seal means preferably has silicone. It is possible here that the bottle is fixed, and held in a fixed position, during the carbonating operation by the pressure with which the seal means is pushed onto the mouth region of the bottle during the carbonating operation. In particular, it is conceivable for a projection and/or bead of the bottle neck to be pushed against the iris device by the pressure that is exerted on the bottle by the seal means. The bottle is thus clamped by the seal means and the iris device during the carbonating operation.

In one embodiment of the present invention, it is conceivable that the carbonation machine comprises a pressure chamber, wherein the pressure chamber is in particular formed adjacent to the seal means. Advantageous automatic sealing of the bottle with respect to the surroundings is thus possible by means of the pressure chamber and the seal means. In particular, it is possible for the bottle to be sealed with respect to the surroundings automatically as soon as the carbonating operation is started and the gas cartridge is opened. It is advantageously conceivable that the iris device fixes the bottle such that, despite the positive pressure that is generated in the pressure chamber (during the carbonating operation) and/or the pressure that the seal means exerts on the bottle, the bottle remains securely fastened in the carbonation machine and in particular is not pushed downwardly out of the carbonation machine.

In one embodiment of the present invention, it is conceivable that, in particular during the carbonating operation, the pressure chamber is connected via a gas connection to an interior of the bottle, preferably such that, during the carbonating operation, a positive pressure provided by the gas cartridge is generated in the pressure chamber, wherein the seal means is pushed against the bottle, in particular such that the bottle is sealed off with respect to the surroundings, by the positive pressure in the pressure chamber. The gas connection between the interior of the bottle and the pressure chamber is preferably in the form of a channel, in particular a channel formed by the seal means. The channel produces a gas connection between the interior of the bottle and the pressure chamber. Now, when a positive pressure is generated in the bottle as a result of the gas cartridge being opened, a positive pressure likewise takes effect in the pressure chamber through the gas connection or the channel. The positive pressure in the pressure chamber is thus particularly advantageously generated by means of the gas cartridge. This positive pressure in the pressure chamber preferably causes the seal means to be pushed downwardly against the bottle, in particular against the mouth region of the bottle, which advantageously results in the bottle being sealed off with respect to the surroundings.

In one advantageous embodiment of the present invention, the carbonation machine has at least one pressure relief valve via which a positive pressure that is present in the bottle can be dissipated after the carbonating operation. The pressure relief valve is preferably switchable between a closed position, in which a positive pressure in the bottle is maintained, and an opened position, in which a positive pressure in the bottle can be dissipated via the valve. The carbonation machine preferably comprises a control element for switching the pressure relief valve. The control element may be actuated by a user of the carbonation machine after a carbonating operation in order to move the pressure relief valve into its opened position and dissipate a positive pressure that is present in the bottle. If the carbonation machine comprises a safety element, in particular a safety door and/or safety window, the safety element is preferably configured to switch the pressure relief valve. The safety element is preferably configured such that, when the safety element is opened, the pressure relief valve is moved into its opened position and a positive pressure that is present in the bottle is dissipated.

The present invention furthermore relates to a method for using a carbonation machine according to an embodiment of the present invention, wherein the method comprises the following steps:

- in a first step, with the receiving device in the bottle-receiving state, the bottle is arranged on the receiving device of the carbonation machine, wherein the bottle has a liquid,
- in a second step, the receiving device is transferred from the bottle-receiving state into the attachment state, wherein, during the transfer from the bottle-receiving state into the attachment state, the bottle is fastened by means of the iris device to the receiving device,
- in a third step, the liquid in the bottle is carbonated.

It is possible that, after the carbonating operation, the receiving device is transferred back into the bottle-receiving state, such that the bottle with the carbonated liquid can be removed.

It is preferably possible that the carbonation of the liquid in the third step is performed using a gas cartridge which, via a gas feed means that projects into the interior of the bottle, provides a gas, in particular $CO_2$, for the carbonation of the liquid in the bottle. The carbonation may for example be initiated by a user using an actuation element, in particular after the receiving device has reached the attachment state and/or after the bottle has been transferred into the preparation position and/or after a safety element, in particular a safety door and/or safety window, has been closed. As an actuation element for initiating the carbonating operation, use may for example be made of a pushbutton, a switch, a touchpad, an acoustic signal, an information-technology signal and/or further actuation elements. It is alternatively conceivable that the carbonating operation starts automatically after the attachment state has been reached and/or after a safety element, in particular a safety door and/or safety window, has been closed.

In one embodiment of the present invention, it is conceivable that, during the carbonating operation in the third step, a positive pressure is built up in the bottle, for the purposes of carbonating the liquid, by means of the gas cartridge. It is preferably possible that, via a gas connection or a channel between the interior of the bottle and a pressure chamber of the carbonation machine, in particular a pressure chamber of the receiving device, the positive pressure that is built up in the bottle is transferred to the pressure chamber. A direct gas connection between the pressure chamber and the gas cartridge (during the carbonating operation) would alternatively also be conceivable. The positive pressure thus built up in the pressure chamber causes a seal means that is arranged at the pressure chamber to be pushed downward in the direction of the bottle. The bottle is pushed downward by the seal means against the iris device, which is in the fastening state, wherein the iris device limits a downward movement of the bottle, in particular such that the bottle cannot be pushed out of the receiving device. It can thus be particularly advantageously ensured that the bottle remains in its preparation position or fastening position.

In one preferred embodiment of the present invention, in particular of the method, in the second step, as the receiving device is transferred from the bottle-receiving state into the attachment state, an iris element of the iris device is guided by its guide means in the direction of a bottle neck of the bottle, in particular such that the bottle is fastened by means of the iris element to the receiving device. It is perfectly possible that, in the second step, further iris elements of the plurality of iris elements are likewise guided by their respective guide means in the direction of a bottle neck of the bottle, in particular such that the bottle is fastened by means of the plurality of iris elements to the receiving device. In the second step, the bottle is thus preferably fastened by means of the plurality of iris elements of the iris device to the receiving device, in particular such that the bottle is no longer removable from the receiving device. Here, in the attachment state, the bottle may be fastened to the receiving device with a clearance, that is to say in particular so as to be movable in parallel with respect to its central axis (in particular upwardly/downwardly) within the receiving device. In its fastening position or preparation position, the bottle may thus in particular still be movable in parallel with respect to its central axis, the bottle however being prevented from exiting the receiving device by the fastening device. It is conceivable that—after the user lets go of the bottle—the bottle moves downward within its clearance under gravitational force, until the movement of said bottle is restricted by the fastening device, in particular by the iris device or its iris elements. Thus, in the attachment state, the bottle remains securely in the carbonation machine. After the user has let go of the bottle, the bottle can thus advantageously be held in a well-defined position by gravitational force and the fastening device. In particular, the flange of the bottle rests on the iris device, in particular on the plurality of iris elements.

In one embodiment of the present invention, it is conceivable that, in the second step, the bottle performs a tilting movement from an, in particular non-vertical, receiving position, in which the bottle has been arranged in the first step, into an, in particular vertical, preparation position. The receiving device for receiving the bottle is preferably, at least in part, tilted concomitantly with the bottle in the second step such that the bottle is transferred from the receiving position into the preparation position. It is preferably possible that, during this tilting movement in the second step, the bottle is fastened in the carbonation machine, in particular with a clearance, by means of the iris device. The tilting movement in the second step arises in particular from the fact that the bottle moves from the receiving position into the preparation position automatically under gravitational force. It is alternatively or additionally possible that a user moves the bottle from the receiving position into the preparation position. It is alternatively or additionally possible that the receiving device is acted on by a spring force, in particular such that, in the second step, the bottle is transferred automatically from the receiving position into the preparation position by means of the spring force.

In one advantageous embodiment of the present invention, in a fourth step that follows the third step, a pressure relief valve of the carbonation machine is opened in order to dissipate a positive pressure that is present in the bottle. The pressure relief valve may be opened as a result of a control element being actuated or as a result of a safety element, in particular a safety door and/or safety window, being opened.

The advantages and developments that have already been described in conjunction with the receiving device according to the invention for receiving a bottle on a carbonation machine or in conjunction with an embodiment of the receiving device according to the invention for receiving a bottle on a carbonation machine can be applied to the carbonation machine according to the invention and to the method according to the invention for using a carbonation machine. The advantages and developments that have already been described in conjunction with the carbonation machine according to the invention or in conjunction with an embodiment of the carbonation machine according to the invention can be applied to the receiving device according to the invention for receiving a bottle on a carbonation machine and to the method according to the invention for using a carbonation machine. The advantages and developments that have already been described in conjunction with the method according to the invention for using a carbonation machine or in conjunction with an embodiment of the method according to the invention for using a carbonation machine can be applied to the receiving device according to the invention for receiving a bottle on a carbonation machine and to the carbonation machine according to the invention.

Further details, features and advantages of the invention will emerge from the drawings and from the following description of preferred embodiments on the basis of the drawings. Here, the drawings illustrate merely exemplary embodiments of the invention, which do not restrict the essential concept of the invention.

DETAILED DESCRIPTION

Identical parts are always denoted by the same reference designations in the various figures, and will therefore generally also each be designated or mentioned only once.

Figure 1:
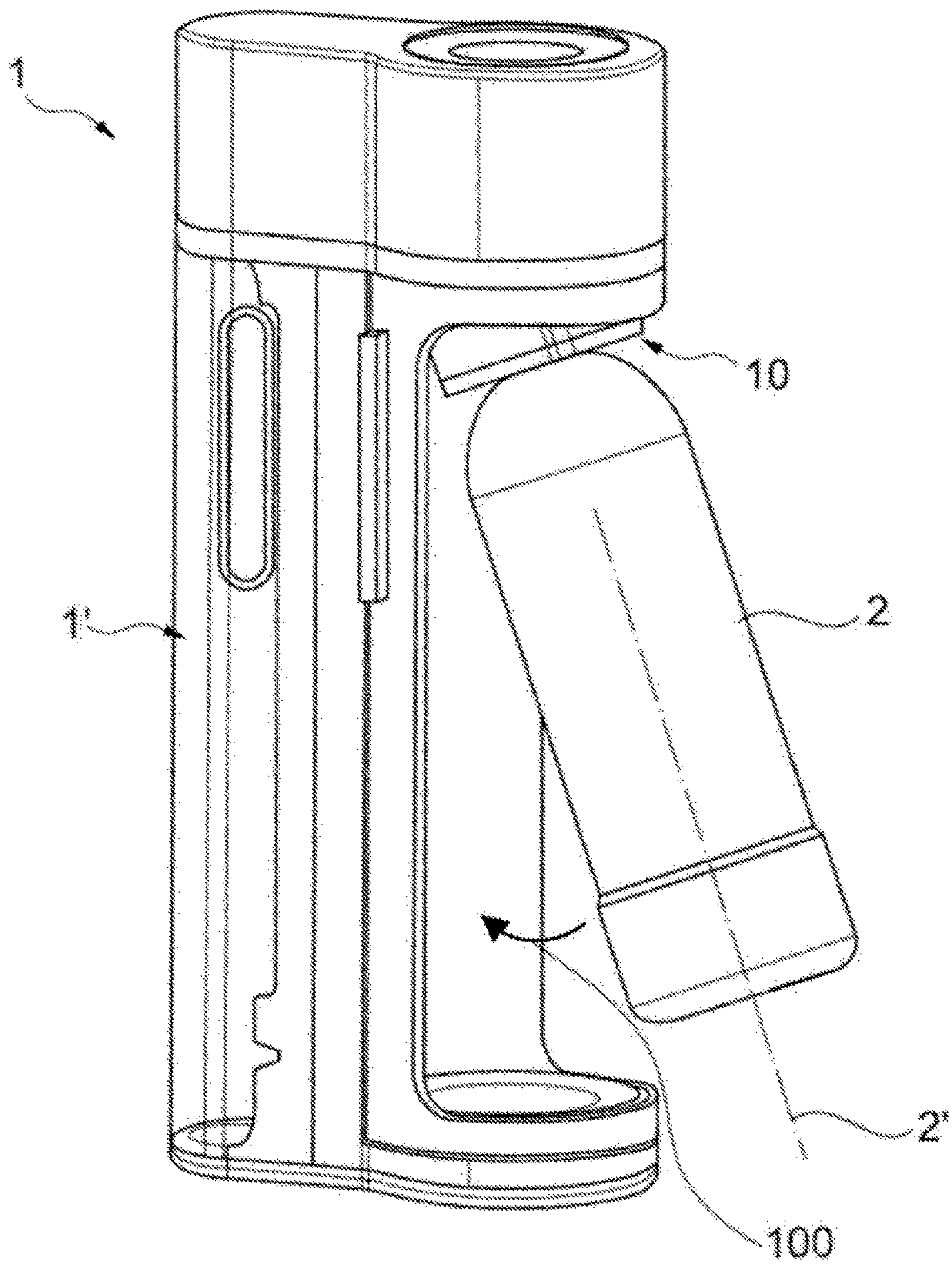
FIGS. 1 and 2 are perspective illustrations of a carbonation machine according to an embodiment of the present invention.

FIG. 1 is a perspective illustration of a carbonation machine 1 according to an exemplary embodiment of the present invention in a bottle-receiving state. The carbonation machine 1 comprises a receiving device 10. When the receiving device 10 is in the bottle-receiving state, the bottle 2 can be arranged in a tilted, non-vertical receiving position on the carbonation machine 1. The central axis 2' of the bottle 2 is accordingly not vertical, but extends obliquely. By means of a tilting movement 100, the bottle 2 can be transferred from the receiving position into an, in particular vertical, preparation position.

The tilting movement 100 of the bottle 2 may for example be performed by a user, who moves the bottle 2 from the receiving position into the preparation position. It is alternatively or additionally possible that the bottle 2 performs the tilting movement 100 from the receiving position into the preparation position automatically under gravitational force, in particular without additional force being applied by the user. It is alternatively or additionally conceivable that the carbonation machine 1 and in particular the receiving device 10 is acted on by a spring force, wherein the spring force causes and/or assists the tilting movement 100 of the bottle 2. According to the invention, it is advantageously possible that a part of the receiving device 10 performs the tilting movement 100 concomitantly with the bottle 2, wherein the receiving device 10 is transferred from the bottle-receiving state into the attachment state of the receiving device 10, in which the bottle 2 is fastened to the receiving device 10.

A gas cartridge that provides the gas for carbonating a liquid, in particular water, which is situated in the bottle 2 can be introduced on the rear side 1' of the carbonation machine 1.

Figure 2:
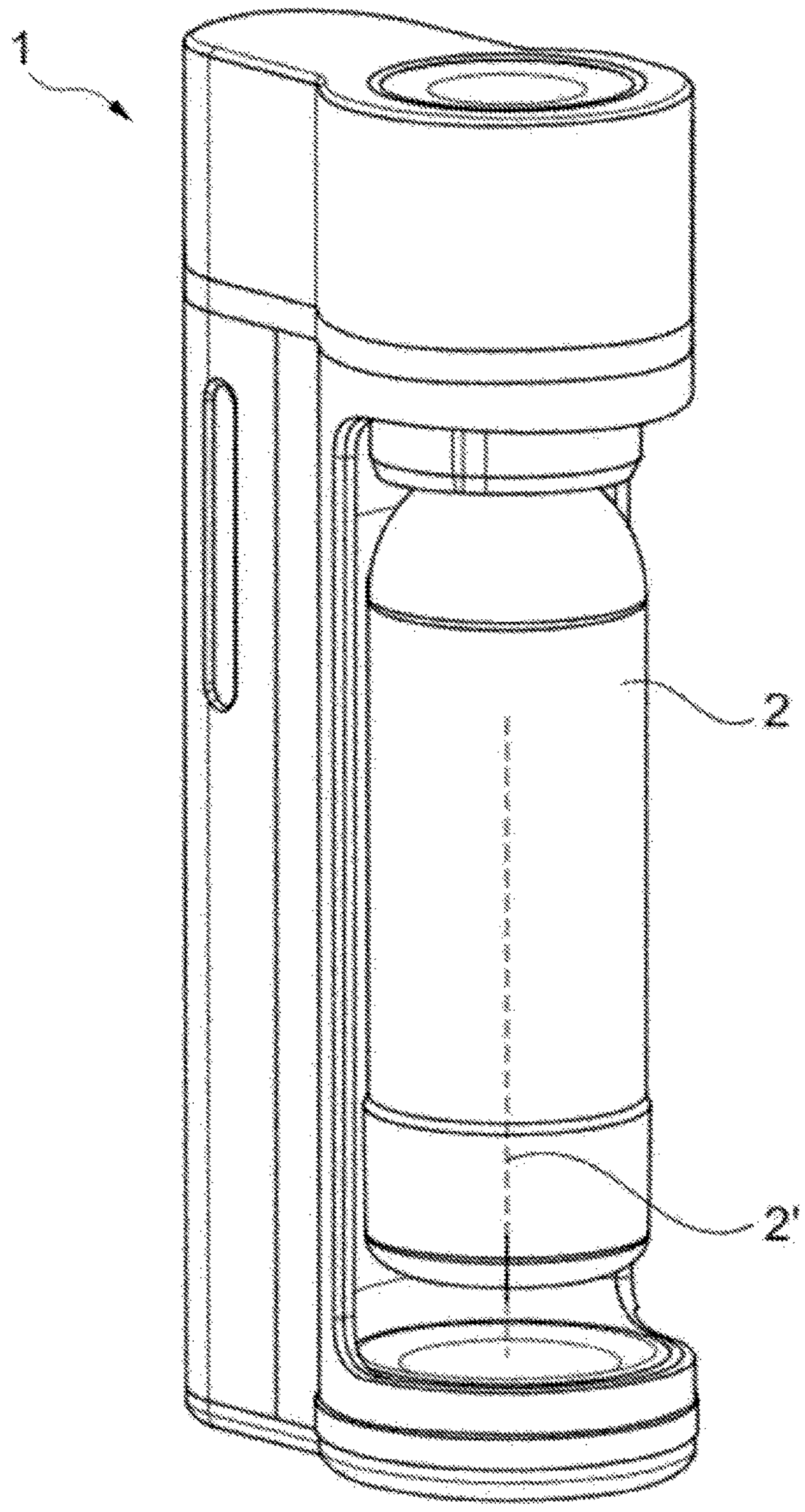

FIG. 2 is a perspective illustration of the carbonation machine 1 according to FIG. 1 in an attachment state, in particular after the completion of the tilting movement 100. In the attachment state, the bottle 2 is situated in the vertical fastening position or preparation position, such that a carbonating operation can be performed.

Figure 3:
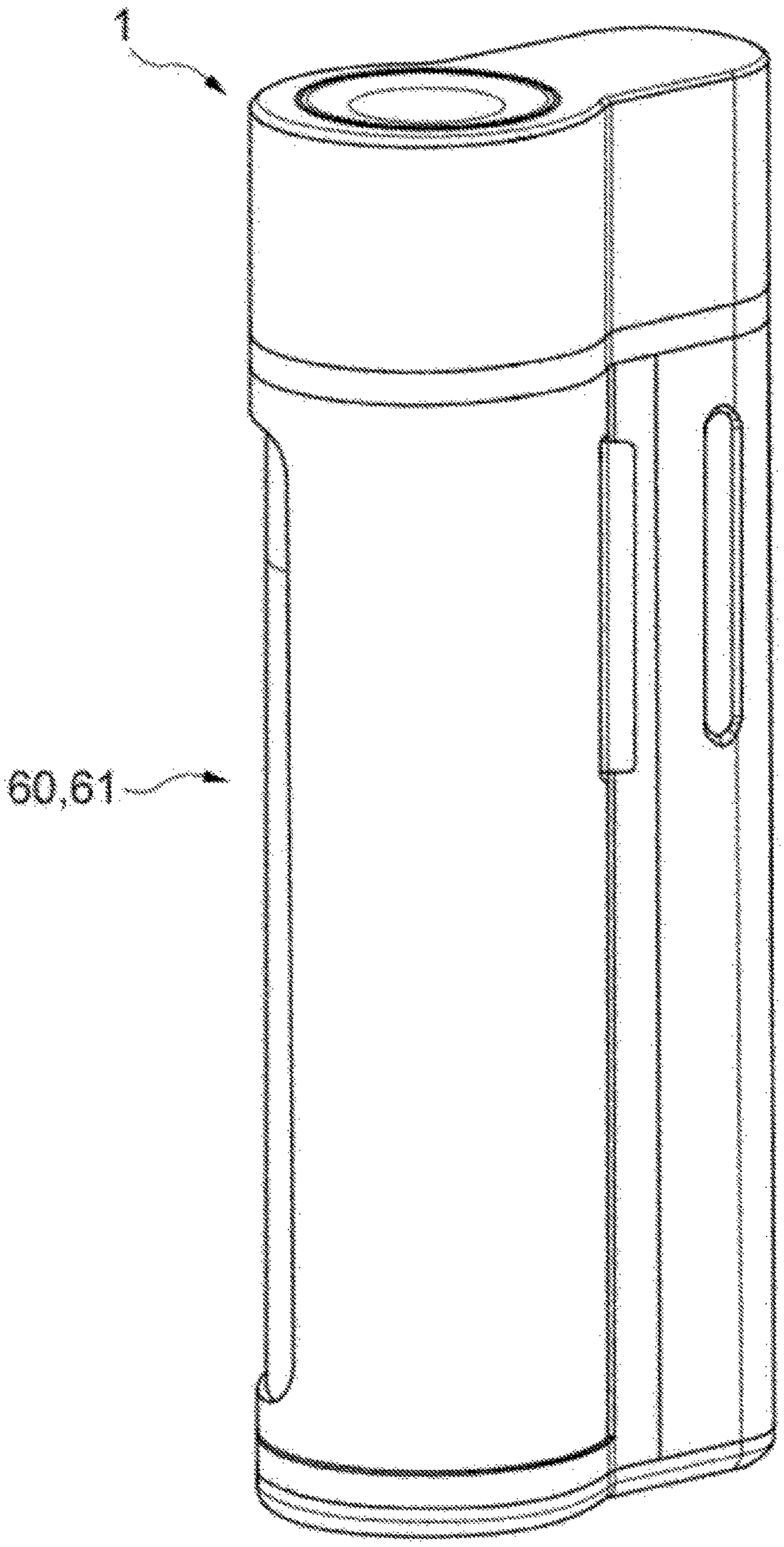
FIG. 3 is a perspective illustration of a carbonation machine according to an embodiment of the present invention.

FIG. 3 is a perspective illustration of a carbonation machine 1 according to an exemplary embodiment of the present invention. In particular, the illustration shows the attachment state, in which a carbonating operation can be performed. The carbonation machine 1 comprises a safety element 60, in particular a safety door 61. In the attachment state, the safety element 60 is arranged in front of the bottle 2 such that the bottle 2 is arranged entirely within the carbonation machine 1. The safety element 60 thus protects the user and the surroundings of the carbonation machine 1, for example against bursting of the bottle 2. It is possible that the carbonating operation can be started only when the safety element 60 has been closed.

Figure 4:
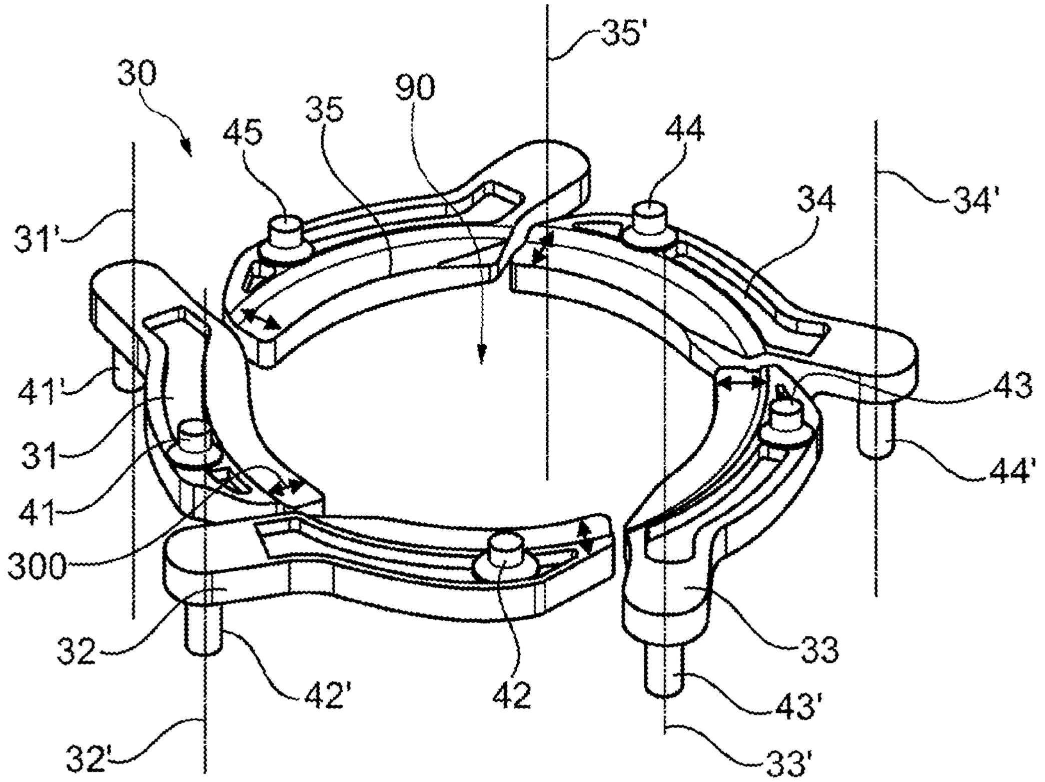
FIG. 4 is a perspective illustration of an iris device according to an exemplary embodiment of the present invention.

FIG. 4 is a perspective illustration of an iris device 30 according to an embodiment of the present invention. The iris device 30 is part of the receiving device 10 for a carbonation machine 1. The iris device 30 comprises a total of five iris elements 31, 32, 33, 34, 35, which together form a central circular opening 90. A bottle 2 can be arranged in the opening 90 (this is not illustrated). A guide means 41 in the form of a pin protrudes from the iris element 31 on the top side of the iris element 31. As the receiving device 10 is transferred from the bottle-receiving state into the attachment state, the iris element 31 is automatically positively guided radially inward in the direction of the bottle by the guide means 41. For this purpose, the iris element 31 has a pivot pin 41' that protrudes downwardly from the iris element 31'. A pivot axis 31' of the iris element 31, about which the iris element 31 is pivotable, extends through said pivot pin 41'. The iris element 31 can thus perform a pivoting movement, symbolized by the arrow 300, from its radially outer position into its radially inner position. FIG. 4 shows the iris device 30 in a closed state, in which it is situated when the receiving device 10 is in the attachment state. The iris element 31 is accordingly illustrated in its radially inner position, in which it is situated in the attachment state in order to secure and fasten the bottle 2 in the receiving device 10. The further iris elements 32, 33, 34, 35 are designed correspondingly to the iris element 31. In particular, all iris elements 31, 32, 33, 34, 35 of the iris device 30 are of identical design. Thus, each of the further iris elements 32, 33, 34, 35 has a guide means 42, 43, 44, 45. As the receiving device 10 is transferred from the bottle-receiving state into the attachment state, the further iris elements 32, 33, 34, 35 are each positively guided by their guide means 42, 43, 44, 45 such that the central opening 90 of the iris device 30 decreases in size as the receiving device 10 is transferred from the bottle-receiving state into the attachment state. For this purpose, the further iris elements 32, 33, 34, 35 each comprise a pivot pin 42', 43', 44', 45', through which pivot pins the pivot axes 32', 33', 34', 35' of the further iris elements 32, 33, 34, 35 respectively extend. The pivot axes 31', 32', 33', 34', 35' of the plurality of iris elements 31, 32, 33, 34, 35 are arranged parallel to one another. The plurality of iris elements 31, 32, 33, 34, 35 therefore together form an iris device 30 having the nature of an iris aperture, in which the size of the central opening 90 is variable by the movement of the plurality of iris elements 31, 32, 33, 34, 35.

Figure 5:
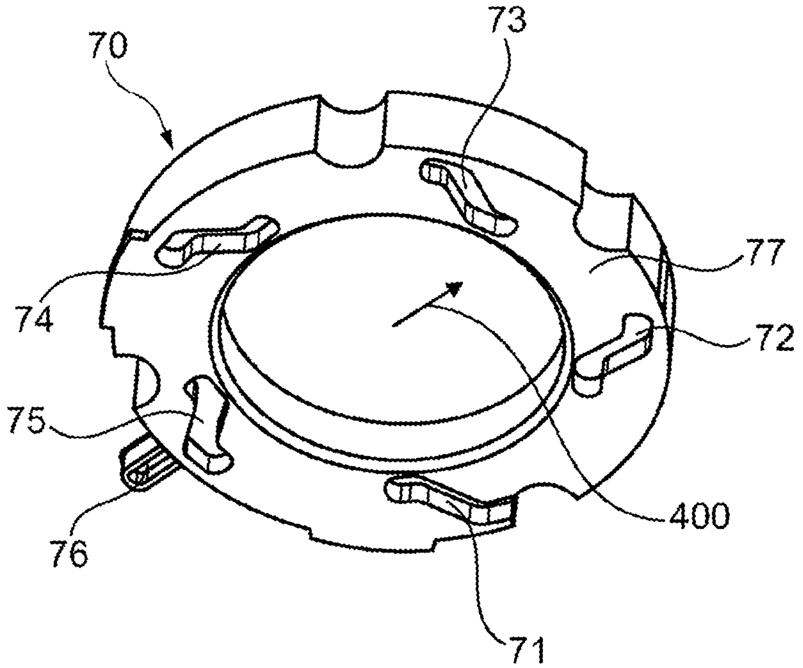
FIG. 5 is a perspective illustration of an intermediate element according to an exemplary embodiment of the present invention.

FIG. 5 is a perspective illustration of an intermediate element 70 according to an embodiment of the present invention. The intermediate element 70 has counterpart guide means 71, 72, 73, 74, 75 for guiding the guide means 41, 42, 43, 44, 45 of the plurality of iris elements 31, 32, 33, 34, 35. The counterpart guide means 71, 72, 73, 74, 75 are each designed as depressions in the form of rails in the main body 77 of the intermediate element 70. A dedicated rail is provided for each guide means 41, 42, 43, 44, 45 of the plurality of iris elements 31, 32, 33, 34, 35, into which rail in each case one of the guide means 41, 42, 43, 44, 45 engages. The counterpart guide means 71, 72, 73, 74, 75 in the form of rails are each of curving form and are oblique with respect to the radial axis 400 and with respect to the circumferential direction of the intermediate element 70, such that the iris elements 31, 32, 33, 34, 35 are each pivoted about their pivot axes 31', 32', 33', 34', 35' during a rotational movement of the intermediate element 70. The intermediate element 70 furthermore has a further guide means 76 in the form of a pin that protrudes radially outwardly from the main body 77. The further guide means 76 may interact with a further counterpart guide means 81 of the receiving device 10. The main body 77 of the intermediate element 70 is disk-shaped and has a central opening into which the bottle neck of a bottle 2 can be guided.

Figure 6:
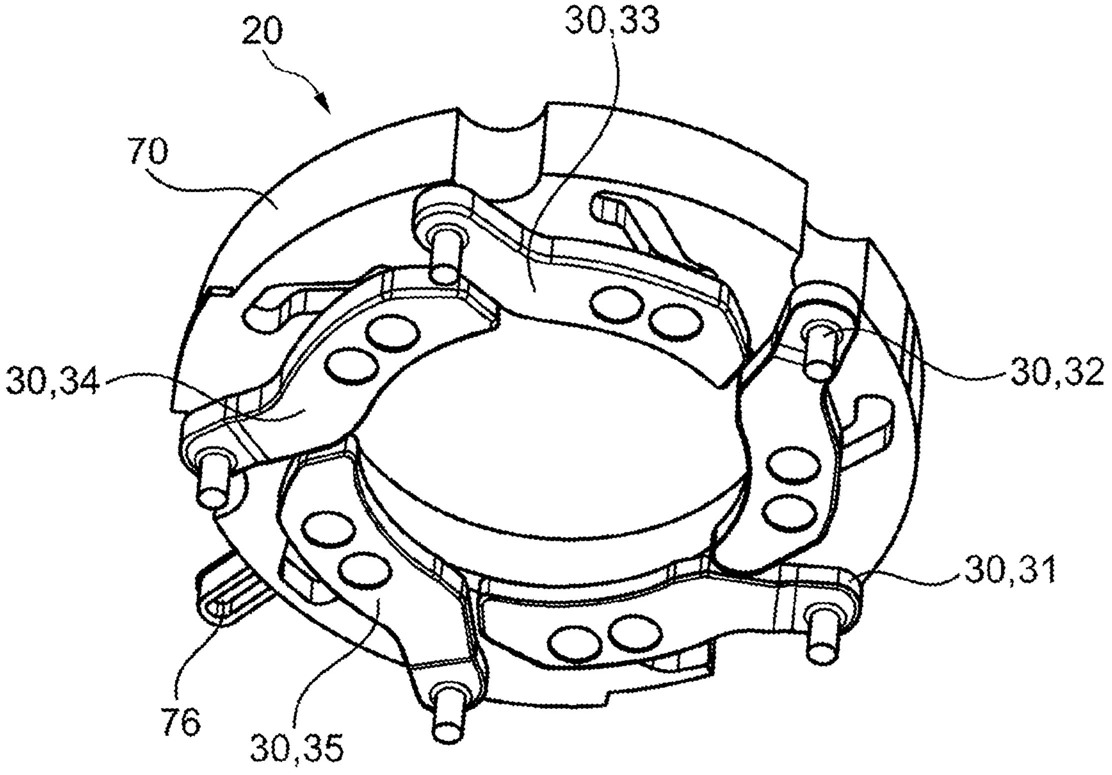
FIG. 6 is a perspective illustration of the iris device of FIG. 4, and of the intermediate element of FIG. 5, according to an embodiment of the present invention.

FIG. 6 is a perspective illustration of the iris device 30 and of the intermediate element 70 according to the embodiments of FIGS. 4 and 5. The iris device 30 and the intermediate element 70 are part of the fastening device 20 for securing a bottle 2 in the receiving device 10. The plurality of iris elements 31, 32, 33, 34, 35 are arranged underneath the intermediate element 70, and the guide means 41, 42, 43, 44, 45 engage into the counterpart guide means 71, 72, 73, 74, 75.

Figure 7:
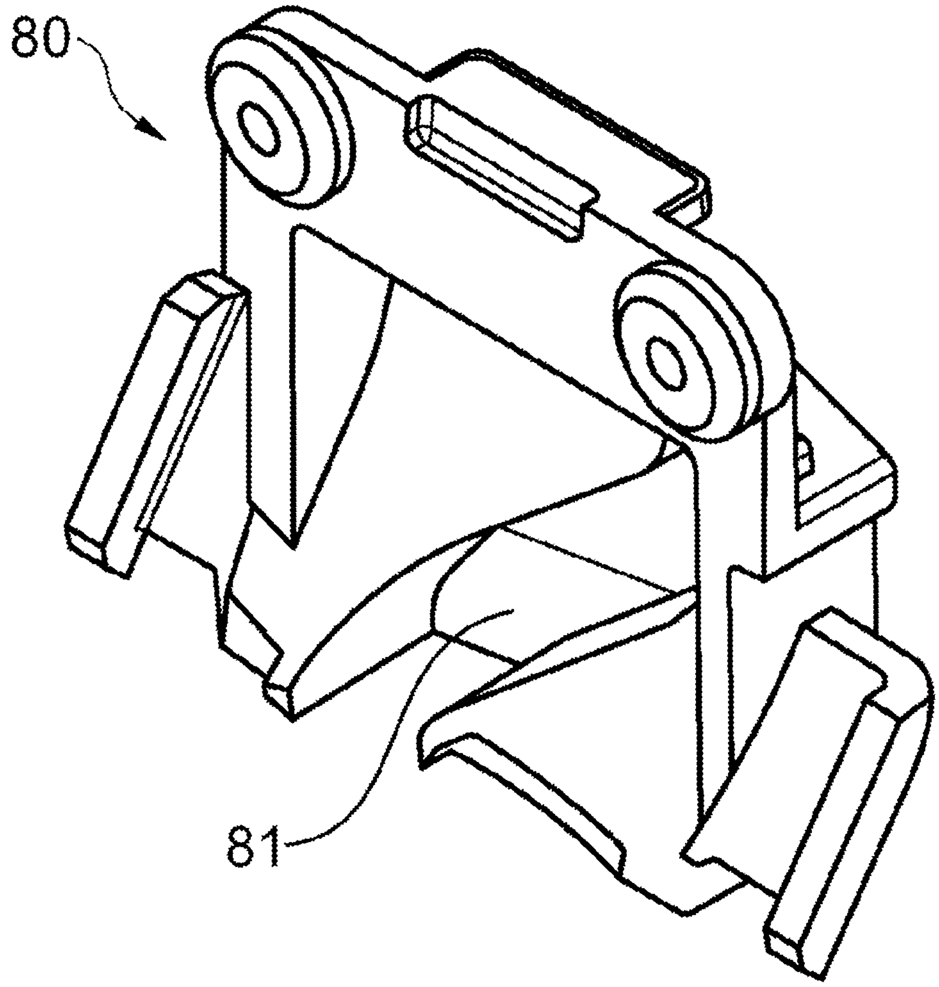
FIG. 7 is a perspective illustration of a counterpart guide part according to an embodiment of the present invention.

FIG. 7 is a perspective illustration of a counterpart guide part 80 of the receiving device 10 according to an embodiment of the present invention. The counterpart guide part 80 is attached in a static manner to the carbonation machine 1. As the receiving device 10 is transferred from the bottle-receiving state into the attachment state, the counterpart guide part 80 therefore does not concomitantly perform the tilting movement 100 of the bottle 2, but remains immovable on the carbonation machine 1. The counterpart guide part 80 comprises a further counterpart guide means 81 which is designed as a rail and which is provided for guiding the further guide means 76, designed as a pin, of the intermediate element 70. The further counterpart guide means 81 is of curving form and/or is, at least in part, oblique with respect to a vertical direction, and is thus configured to guide the further guide means 76—during the tilting movement that the intermediate element 70 performs concomitantly with the bottle 2—such that the intermediate element 70 is forced to perform a rotational movement in a circumferential direction of the intermediate element 70.

Figure 8:
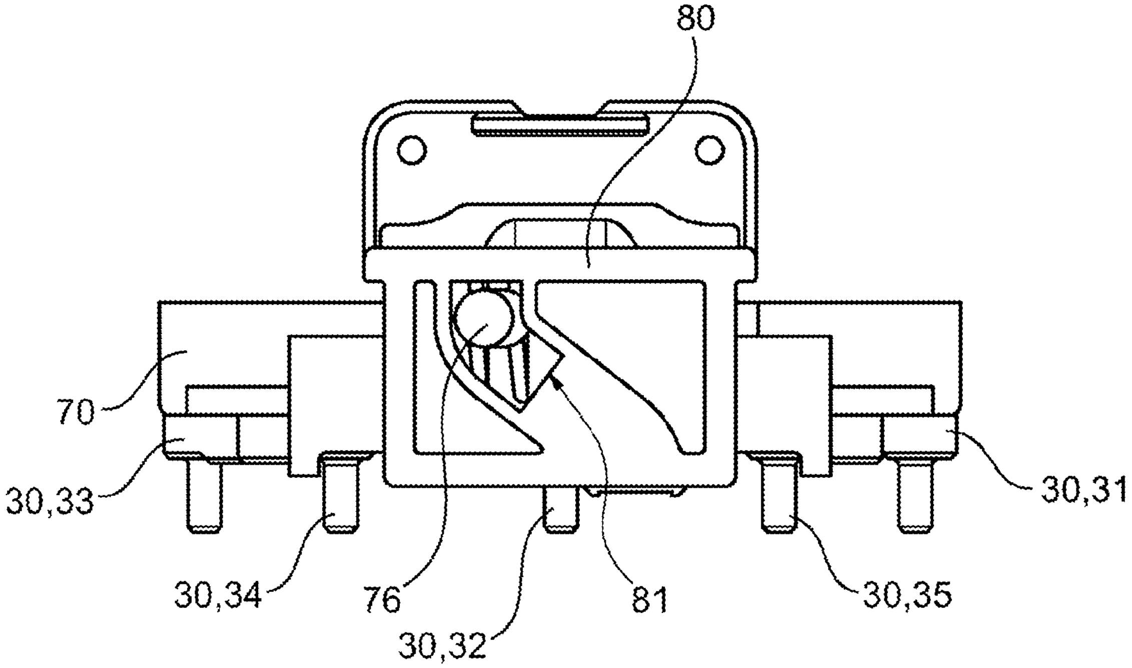
FIGS. 8 and 9 are illustrations of the iris device of FIG. 4, of the intermediate element of FIG. 5, and of the counterpart guide part of FIG. 7, according to an embodiment of the present invention.
Figure 9:
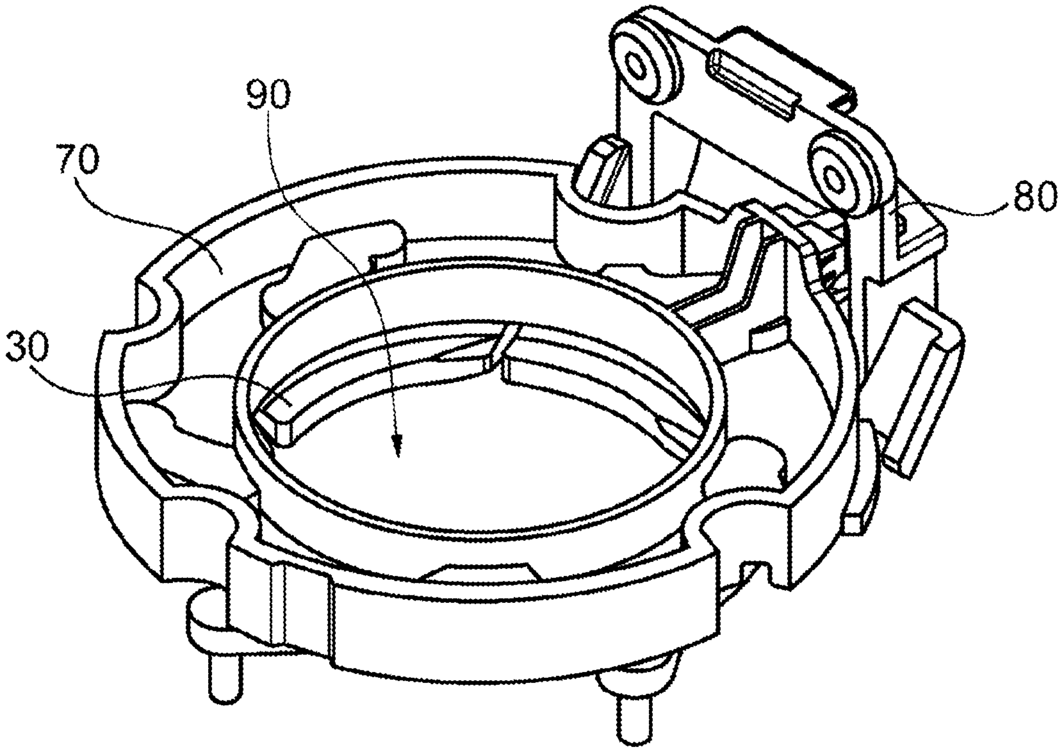

FIGS. 8 and 9 are perspective illustrations of the iris device 30, of the intermediate element 70 and of the counterpart guide part 80 as per FIGS. 4 to 7. Here, FIGS. 8 and 9 both illustrate the attachment state, in particular after the completion of the tilting movement 100 of the bottle 2. The iris elements 31, 32, 33, 34, 35 are thus each situated in their radially inner positions.

In the illustrated exemplary embodiment of the present invention, the bottle 2 is secured in particular as follows. In the bottle-receiving state, the bottle 2 is introduced in an oblique position, or receiving position, into the receiving device 10. As the receiving device is transferred from the bottle-receiving state into the attachment state, the bottle 2 performs a tilting movement 100, wherein the bottle 2 is transferred from the oblique receiving position (in the bottle-receiving state) into an, in particular vertical, preparation position (in the attachment state). The iris device 30 and the intermediate element 70 perform this tilting movement 100 concomitantly with the bottle 2, whilst the counterpart guide part 80 remains static on the carbonation machine 1. During the tilting movement 100 of the bottle 2 from the receiving position (in the bottle-receiving state) into the preparation position (in the attachment state), the further guide means 76, designed as a pin, of the intermediate element 70 moves in a vertical direction in the further counterpart guide means 81, designed as a rail, of the counterpart guide part 80. In the process, owing to the geometrical design of the further counterpart guide means 81, the further guide means 76 is forced to perform a sideward movement. This sideward movement of the further guide means 76 leads to a rotational movement of the intermediate element 70 in the circumferential direction. The rotational movement of the intermediate element 70 in the circumferential direction causes the counterpart guide means 71, 72, 73, 74, 75 of the intermediate element 70 to likewise move in the circumferential direction, such that the counterpart guide means 71, 72, 73, 74, 75 are moved relative to the guide means 41, 42, 43, 44, 45 of the iris elements 31, 32, 33, 34, 35. The geometrical design of the counterpart guide means 71, 72, 73, 74, 75 is such that, in the process (that is to say during the rotational movement of the intermediate element 70), the guide means 41, 42, 43, 44, 45 are guided, at least in part, in a radial direction (or along the radial axis 400) by the counterpart guide means 71, 72, 73, 74, 75, whereby the iris elements 31, 32, 33, 34, 35 are each forced to perform pivoting movements about their pivot axes in the direction of the bottle neck. This causes the size of the opening 90 of the iris device 30 to be reduced and the iris device 30 to be guided into a locking position in which it prevents the bottle 2 from being able to escape downwardly from the receiving device 10.

Figure 10:
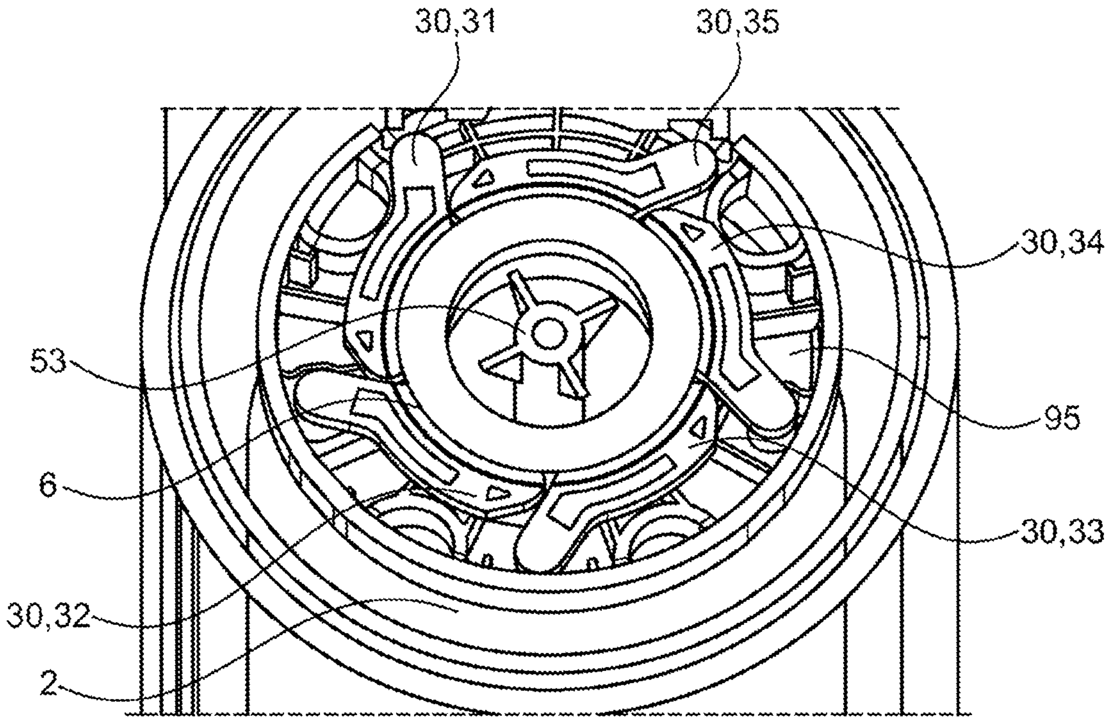
FIG. 10 is a perspective sectional illustration through a carbonation machine according to an embodiment of the present invention.

FIG. 10 is a perspective sectional illustration through a carbonation machine 1 according to an embodiment of the present invention. The receiving device 10 of the carbonation machine 1 is situated in the attachment state. A projection 6 of the bottle 2, which is formed over the entire circumference on the bottle neck of the bottle 2 and which protrudes radially outward from the bottle neck, rests on the iris device 30, such that the bottle 2 cannot move downwardly out of the receiving device 10. The pivot pins 41', 42', 43', 44', 45' of the iris elements 31, 32, 33, 34, 35 are arranged in corresponding cutouts of a covering element 95 of the receiving device 10, such that the iris elements 31, 32, 33, 34, 35 are pivotable. The carbonation machine 1 furthermore comprises a gas feed means 53 which projects into the bottle 2 when the bottle 2 is in the attached state.

Figure 11:
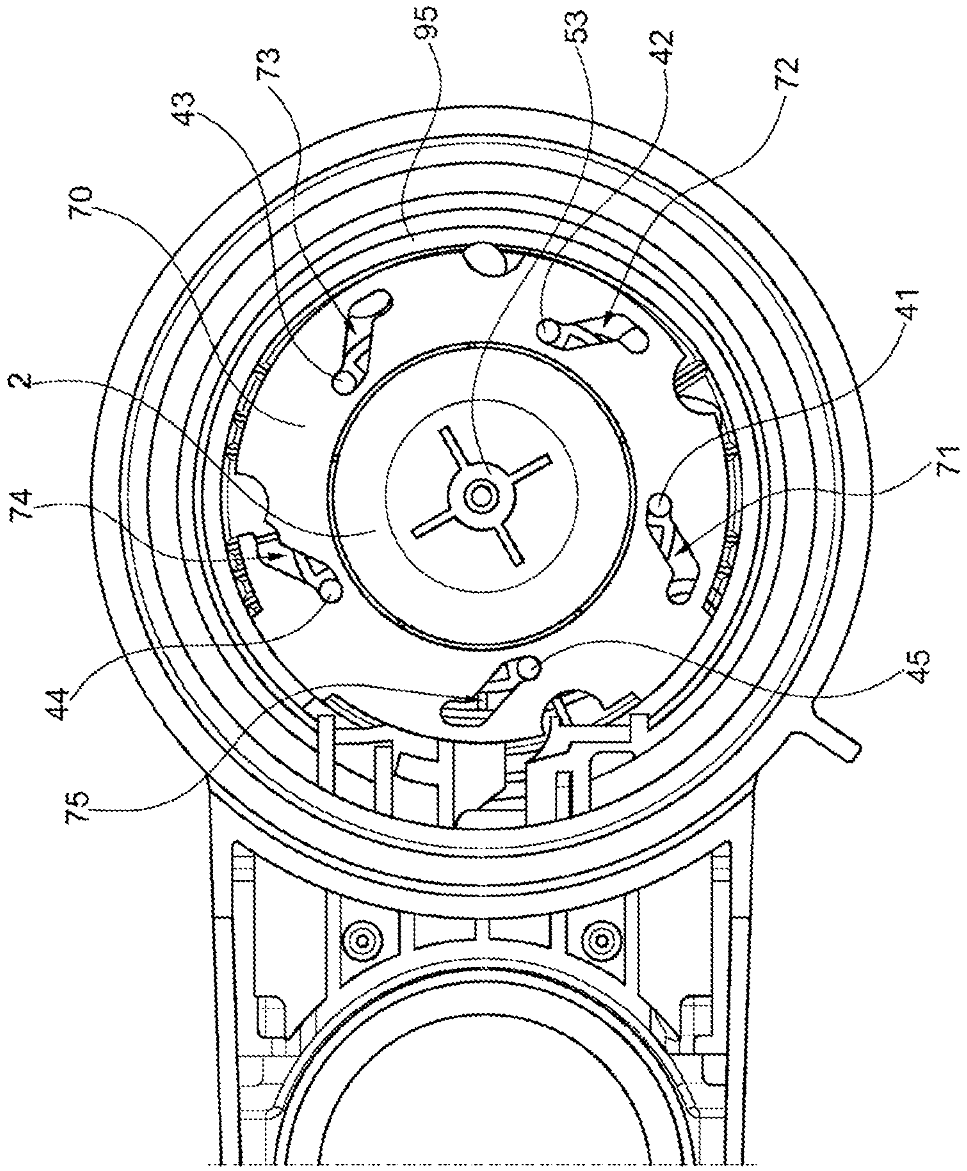
FIG. 11 is a sectional illustration through a carbonation machine according to an embodiment of the present invention in plan view.

FIG. 11 is a further, schematic sectional illustration through the carbonation machine 1 according to the embodiment of FIG. 10.

Figure 12:
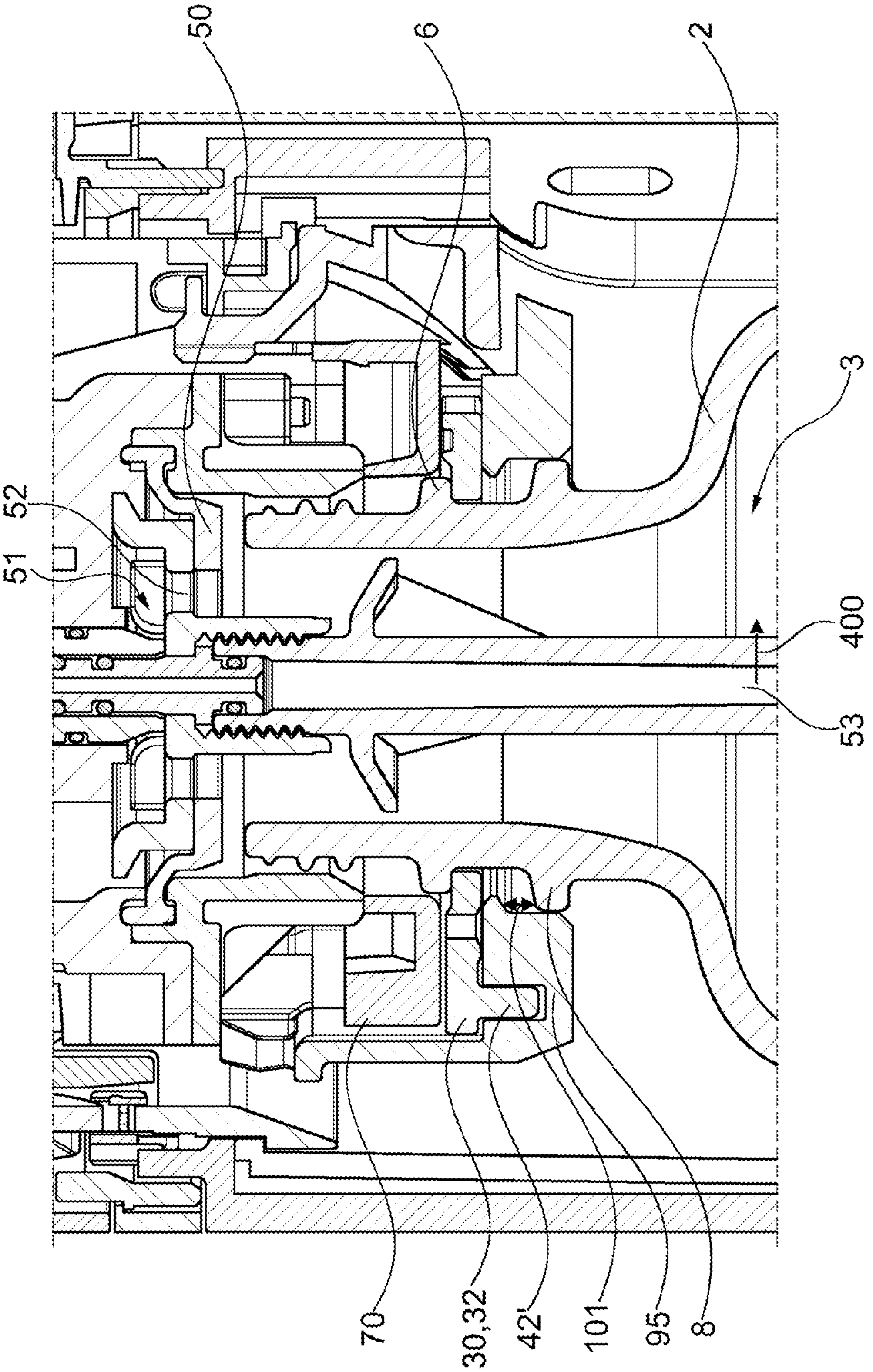
FIG. 12 is a sectional illustration through a carbonation machine in the region of the receiving device according to an embodiment of the present invention.

FIG. 12 is a further, schematic sectional illustration through the carbonation machine 1 according to the embodiment of FIGS. 10 and 11. By contrast to FIGS. 10 and 11, the section plane extends vertically. In the illustration of FIG. 12, the receiving device 10 of the carbonation machine 1 is situated in the attachment state, before the carbonating operation is initiated. The iris elements of the iris device 30 are each in their radially inner position. The projection 6 of the bottle 2 is resting on the iris device 30, such that the iris device 30 prevents the bottle 2 from being able to escape downwardly from the receiving device 10. Here, the bottle 2 is secured in its vertical fastening position in the carbonation machine so as to have a vertical clearance 101. The clearance 101 is delimited here in particular by the collar 8 of the bottle 2, which is formed on the bottle neck in particular below the projection 6 and with a spacing to the projection 6, and the covering element 95. The collar 8 encircles the bottle neck over the full circumference, or only in certain portions, in the circumferential direction. In particular, the bottle 2 can be introduced into the receiving device 10 only as far as the point at which the collar 8 of the bottle 2 abuts against the covering element 95 from below. The depth to which the bottle can be introduced into the receiving device 10 is thus limited by the covering element 95 and the collar 8 of the bottle 2. It is preferably possible for the bottle to also have a clearance along the radial axis 400, and/or to be clamped by the iris device 30 so as not to be immovable along the radial axis 400. Advantageous compatibility of the receiving device 10 with bottles 2 that have different diameters at the bottle neck can thus be achieved. In the state shown in FIG. 12, the bottle 2 has already been let go of by the user who has inserted said bottle into the carbonation machine 1, such that the bottle 2 has moved downward within its clearance 101 and is resting with its projection 6 on the iris device 30, which is situated in the fastening position. Therefore, in the illustration shown, the covering element 95 is not in contact with the collar 8. The spacing between the collar 8 and the covering element 95 is in particular dependent on the size of the clearance 101 that the bottle 2 has in terms of its vertical fastening position in the attachment state. In the embodiment illustrated, the projection 6 on the bottle neck has an approximately rectangular cross section, wherein the projection 6 extends outward from the bottle neck. Other shapes and designs, in particular other cross-sectional geometries, are also conceivable for the projection 6. It is preferably possible for the projection 6 to be formed over the full circumference around the bottle neck in the circumferential direction. It is alternatively conceivable for the projection 6 to be formed only in certain portions, in particular with interruptions in the circumferential direction. By means of the projection 6 and the iris device 30, the bottle 2 is fastened to the receiving device such that the bottle 2 cannot exit the receiving device 10 in the attachment state, such that a carbonating operation can be performed reliably. Since the iris device 30 surrounds the bottle neck over the full circumference, a particularly large area of contact is formed between the projection 6 and the iris device 30, which leads to particularly advantageous mechanical stability.

The carbonation machine furthermore comprises a seal means 50, which is pushed onto the mouth region of the bottle 2 for sealing purposes during the carbonating operation. In the state shown in FIG. 12, the carbonating operation has not yet been initiated, and the seal means 50 is still spaced apart from the mouth region of the bottle 2.

To carbonate the liquid that is situated in the bottle 2, a gas feed means 53 projects into the bottle 2 from above. Via the gas feed means 53, $CO_2$ can enter the bottle 2 from a gas cartridge during the carbonating operation. A positive pressure thus forms in the interior 3 of the bottle 2. The interior 3 of the bottle 2 is connected via a gas connection 52 to a pressure chamber 51. The gas connection 52 is guided through the seal means 50 that is provided for sealing the bottle 2 during the carbonating operation. Via the gas connection 52, the positive pressure that builds up in the interior 3 of the bottle 2 during the carbonating operation is transferred to the pressure chamber 51, such that a positive pressure also prevails in the pressure chamber 51. This positive pressure in the pressure chamber 51 pushes the seal means 50 downward onto the mouth region of the bottle 2. The projection 6 of the bottle 2 is thus pushed firmly onto the iris device 30, and the bottle 2 is securely fixed and clamped. Particularly advantageous automatic pneumatic sealing during the carbonating operation is thus possible. The seal means 50 is preferably flexible and/or pliable. The seal means 50 may for example be manufactured using silicone.

LIST OF REFERENCE DESIGNATIONS

1 Carbonation machine
1' Rear side of the carbonation machine
2 Bottle

2 Axis of the bottle
3 Interior of the bottle
6 Projection
8 Collar
10 Receiving device
20 Fastening device
30 Iris device
31 Iris element
32-35 Iris elements
31' Pivot axis
32'-35' Pivot axes
41 Guide means
42-45 Guide means
41' Pivot pin
42'-45' Pivot pins
50 Seal means
51 Pressure chamber
52 Gas connection
53 Gas feed means
60 Safety element
61 Safety door
70 Intermediate element
71 Counterpart guide means
72-75 Counterpart guide means
76 Further guide means
77 Main body of the intermediate element
80 Counterpart guide part
81 Further counterpart guide means
90 Opening
95 Covering element
100 Tilting movement
101 Clearance
300 Pivoting movement
400 Radial axis

The invention claimed is:

1. A carbonation machine comprising:

a receiving device for receiving a bottle, the receiving device has a fastening device for fastening the bottle, the fastening device comprises an iris device, the iris device has an opening, the opening of the iris device is configured to have a variable size, wherein the receiving device is transferable from a bottle-receiving state, which is configured for receiving the bottle, into an attachment state, in which the bottle is attached to the receiving device, wherein as the receiving device is transferred from the bottle-receiving state into the attachment state, a size of the opening of the iris device decreases, wherein in the bottle-receiving state, the bottle is arranged in a non-vertical receiving position on the receiving device; and in the attachment state, the bottle is arranged in a preparation position, and as the receiving device is transferred from the bottle-receiving state into the attachment state, the bottle is tilted from the non-vertical receiving position into the preparation position, wherein the iris device has an iris element, the iris element is configured to pivot, the iris element is arranged in a radially outer position in the bottle-receiving state, and as the receiving device is transferred from the bottle-receiving state into the attachment state, the iris element is pivoted from the radially outer position into a radially inner position about a pivot axis, the radially inner position is provided for fastening the bottle.

2. The carbonation machine as claimed in claim 1, wherein the iris element has a guide means, the fastening device has an intermediate element, the intermediate element has a counterpart guide means which complements the guide means of the iris element, wherein as the receiving device is transferred from the bottle-receiving state into the attachment state, the iris element is guided from the radially outer position into the radially inner position by the guide means and the counterpart guide means.

3. The carbonation machine as claimed in claim 2, wherein the intermediate element has a further guide means, wherein the receiving device has a further counterpart guide means which complements the further guide means of the intermediate element, wherein as the receiving device is transferred from the bottle-receiving state into the attachment state, the intermediate element is guided by the further guide means and the further counterpart guide means such that the intermediate element performs a rotational movement in a circumferential direction of the intermediate element.

4. The carbonation machine as claimed in claim 3, wherein as the receiving device is transferred from the bottle-receiving state into the attachment state, the iris element is guided from the radially outer position into the radially inner position by the rotational movement of the intermediate element and by the guide means and the counterpart guide means.

5. The carbonation machine as claimed in claim 1, wherein the iris device has a plurality of iris elements, the plurality of iris elements are each pivotable, wherein the plurality of iris elements are each arranged in a radially outer position in the bottle-receiving state, and as the receiving device is transferred from the bottle-receiving state into the attachment state, the iris elements are each pivoted from their radially outer positions into radially inner positions about their pivot axes, wherein the radially inner positions are provided for fastening the bottle, and optionally the plurality of iris elements comprise five iris elements, wherein in the attachment state, the bottle is arranged in a vertical preparation position.

6. The carbonation machine as claimed in claim 5, wherein the pivoting of the plurality of iris elements from their radially outer positions into their radially inner positions causes the size of the opening of the iris device to decrease.

7. The carbonation machine as claimed in claim 2, wherein the guide means of the iris element has a projection, pin and/or bolt, the counterpart guide means of the intermediate element has a rail configured for guiding the guide means, has a recess and/or depression.

8. The carbonation machine as claimed in claim 3, wherein the further guide means of the intermediate element has a projection, pin and/or bolt, the further counterpart guide means of the receiving device has a rail configured for guiding the further guide means, has a recess and/or depression.

9. The carbonation machine as claimed in claim 3, wherein the intermediate element comprises a disk-shaped main body having a central opening.

10. The carbonation machine as claimed in claim 1, wherein the carbonation machine comprises a safety element that is a safety door and/or a safety window, and wherein in the attachment state, the safety element is arranged in front of the bottle such that, by means of the safety element, the bottle is arranged within the carbonation machine.

11. The carbonation machine as claimed in claim 10, wherein the carbonation machine comprises an actuation element for initiation of a carbonating operation by a user, the actuation element being coupled to the safety element such that the carbonating operation can be started only when the safety element has been arranged in front of the bottle such that, by means of the safety element, the bottle is within the carbonation machine.

12. The carbonation machine as claimed in claim 10, wherein the carbonation machine comprises a seal means for sealing off the bottle with respect to surroundings during a carbonating operation, wherein the seal means seals off the bottle with respect to the surroundings by means of a pressure provided by a gas cartridge, during the carbonating operation.

13. The carbonation machine as claimed in claim 12, wherein the carbonation machine comprises a pressure chamber, the pressure chamber is formed adjacent to the seal means.

14. The carbonation machine as claimed in claim 13, wherein during the carbonating operation, the pressure chamber is connected via a gas connection to an interior of the bottle such that, during the carbonating operation, a positive pressure provided by the gas cartridge is generated in the pressure chamber, wherein the seal means is pushed against the bottle such that the bottle is sealed off with respect to the surroundings by the positive pressure in the pressure chamber.

15. The carbonation machine as claimed in claim 10 wherein the carbonation machine has at least one pressure relief valve via which a positive pressure that is present in the bottle can be dissipated after the carbonating operation.

16. The carbonation machine as claimed in claim 15, wherein the pressure relief valve is switchable between a closed position, in which the positive pressure in the bottle is maintained, and an opened position, in which the positive pressure in the bottle can be dissipated via the pressure relief valve.

17. The carbonation machine as claimed in claim 16, wherein the safety element is configured such that, when the safety element is opened, the pressure relief valve is moved into the opened position and the positive pressure that is present in the bottle is dissipated.

18. The carbonation machine as claimed in claim 16, wherein the carbonation machine has a control element for switching the pressure relief valve.

19. A method for using the carbonation machine as claimed in claim 1, wherein the method comprises:

in a first step, with the receiving device in the bottle-receiving state, the bottle is arranged on the receiving device of the carbonation machine, wherein the bottle has a liquid, in a second step, the receiving device is transferred from the bottle-receiving state into the attachment state, wherein, during the transfer from the bottle-receiving state into the attachment state, the bottle is fastened by the iris device to the receiving device, and in a third step, the liquid in the bottle is carbonated.

20. The method as claimed in claim 19, wherein in or during the second step, as the receiving device is transferred from the bottle-receiving state into the attachment state, the iris element of the iris device is guided by its guide means in the direction of a bottle neck of the bottle such that the bottle is fastened by means of the iris element to the receiving device.

21. A carbonation machine comprising:

a receiving device for receiving a bottle, the receiving device has a fastening device for fastening the bottle, the fastening device comprises an iris device, the iris device has an opening, the opening of the iris device is configured to have a variable size, wherein the receiving device is transferable from a bottle-receiving state, which is configured for receiving the bottle, into an attachment state, in which the bottle is attached to the receiving device, wherein as the receiving device is transferred from the bottle-receiving state into the attachment state, a size of the opening of the iris device decreases, wherein in the bottle-receiving state, the bottle is arranged in a non-vertical receiving position on the receiving device; and in the attachment state, the bottle is arranged in a preparation position, and as the receiving device is transferred from the bottle-receiving state into the attachment state, the bottle is tilted from the non-vertical receiving position into the preparation position, wherein the iris element has a guide means, the fastening device has an intermediate element, the intermediate element has a counterpart guide means which complements the guide means of the iris element, wherein as the receiving device is transferred from the bottle-receiving state into the attachment state, the iris element is guided from a radially outer position into a radially inner position by the guide means and the counterpart guide means.

22. A carbonation machine comprising:

a receiving device for receiving a bottle, the receiving device has a fastening device for fastening the bottle, the fastening device comprises an iris device, the iris device has an opening, the opening of the iris device is configured to have a variable size, wherein the receiving device is transferable from a bottle-receiving state, which is configured for receiving the bottle, into an attachment state, in which the bottle is attached to the receiving device, wherein as the receiving device is transferred from the bottle-receiving state into the attachment state, a size of the opening of the iris device decreases, wherein in the bottle-receiving state, the bottle is arranged in a non-vertical receiving position on the receiving device; and in the attachment state, the bottle is arranged in a preparation position, and as the receiving device is transferred from the bottle-receiving state into the attachment state, the bottle is tilted from the non-vertical receiving position into the preparation position, wherein the carbonation machine comprises a safety element that is a safety door and/or a safety window, and wherein in the attachment state, the safety element is arranged in front of the bottle such that, by means of the safety element, the bottle is arranged within the carbonation machine, wherein the carbonation machine comprises an actuation element for initiation of a carbonating operation by a user, the actuation element being coupled to the safety element such that the carbonating operation can be started only when the safety element has been arranged in front of the bottle such that, by means of the safety element, the bottle is within the carbonation machine.

23. A method for using a carbonation machine comprising a receiving device for receiving a bottle, the receiving device has a fastening device for fastening the bottle, the fastening device comprises an iris device, the iris device has an opening, the opening is configured to have a variable size, wherein the receiving device is transferable from a bottle-receiving state, which is configured for receiving the bottle, into an attachment state, in which the bottle is attached to the receiving device, wherein as the receiving device is transferred from the bottle-receiving state into the attachment state, a size of the opening of the iris device decreases, wherein in the bottle-receiving state, the bottle is arranged in a non-vertical receiving position on the receiving device; and in the attachment state, the bottle is arranged in a preparation position, and as the receiving device is transferred from the bottle-receiving state into the attachment state, the bottle is tilted from the non-vertical receiving position into the preparation position, wherein the method comprises:

a first step, with the receiving device in the bottle-receiving state, the bottle is arranged on the receiving device of the carbonation machine, wherein the bottle has a liquid, a second step, the receiving device transferred from the bottle-receiving state into the attachment state, wherein, during the transfer from the bottle-receiving state into the attachment state, the bottle is fastened by the iris device to the receiving device, and a third step, the liquid in the bottle is carbonated;

wherein in or during the second step, as the receiving device is transferred from the bottle-receiving state into the attachment state, an iris element of the iris device is guided by a guide means in a direction of a bottle neck of the bottle such that the bottle is fastened by means of the iris element to the receiving device.

* * * * *